United States Patent
Deng (10) Patent No.: US 10,281,789 B2
(45) Date of Patent: May 7, 2019

(54) METHOD FOR MANUFACTURING COA ARRAY SUBSTRATE AND COA ARRAY SUBSTRATE

(71) Applicant: Shenzhen China Star Optoelectronics Technology Co., Ltd., Shenzhen (CN)

(72) Inventor: Weijia Deng, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/136,212

(22) Filed: Sep. 19, 2018

(65) Prior Publication Data

US 2019/0018269 A1 Jan. 17, 2019

Related U.S. Application Data

(62) Division of application No. 14/908,554, filed on Jan. 29, 2016, now Pat. No. 10,114,262.

(30) Foreign Application Priority Data

Nov. 20, 2015 (CN) .......................... 2015 1 0809106

(51) Int. Cl.
G02F 1/1368 (2006.01)
G02F 1/1362 (2006.01)
G02F 1/1343 (2006.01)

(52) U.S. Cl.
CPC .......... *G02F 1/1368* (2013.01); *G02F 1/1362* (2013.01); *G02F 1/13439* (2013.01); *G02F 1/136209* (2013.01); *G02F 2001/134345* (2013.01); *G02F 2001/136222* (2013.01); *G02F 2201/123* (2013.01); *G02F 2202/10* (2013.01); *G02F 2202/36* (2013.01)

(58) Field of Classification Search
CPC .............. G02F 1/1368; G02F 1/13439; G02F 1/136209; G02F 2202/10; G02F 2001/134345; G02F 2201/123; G02F 2202/36; G02F 2001/136222
See application file for complete search history.

(56) References Cited

U.S. PATENT DOCUMENTS

| 2011/0158901 | A1* | 6/2011 | Santra | B82Y 5/00 424/1.11 |
| 2015/0380671 | A1* | 12/2015 | Shu | G02F 1/133617 257/13 |

\* cited by examiner

*Primary Examiner* — Selim U Ahmed
(74) *Attorney, Agent, or Firm* — Leong C. Lei (57) ABSTRACT

A COA array substrate includes a base substrate, a TFT layer disposed on the base substrate, a pixel electrode layer and black matrixes disposed on the TFT layer, and a quantum dot color filter film disposed on the pixel electrode layer. The quantum dot color filter film is formed through electrochemical deposition applied to a mixture of quantum dots dispersed in electrolyte including chitosan. Through application of a voltage, chitosan brings the quantum dots to deposit on the TFT layer.

7 Claims, 6 Drawing Sheets

METHOD FOR MANUFACTURING COA ARRAY SUBSTRATE AND COA ARRAY SUBSTRATE

CROSS REFERENCE TO RELATED APPLICATIONS

This is a divisional application of co-pending patent application Ser. No. 14/908,554, filed on Jan. 29, 2016, which is a national stage of PCT Application No. PCT/CN2015/098504, filed on Dec. 23, 2015, claiming foreign priority of Chinese Patent Application No. 201510809106.0, filed on Nov. 20, 2015.

FIELD OF THE DISCLOSURE

The present disclosure relates to a display technology field, and more particularly to a method for manufacturing a COA array substrate and a COA array substrate.

BACKGROUND OF THE DISCLOSURE

With the development of the display technology, much emphasis has been laid upon display quality of a display device. Quantum dots (QDs) can be spherical or roundish semiconductor nanoparticles consisting of II-VI group or III-V group elements, whose sizes are between 0 to 100 nanometers. Quantum dots show quantum confinement effect as sizes of particles are smaller than Bohr radius of exciton of corresponding bulk material, the energy level structure changes from quasi continuousness of bulk material to discrete structure of quantum dot material, which leads to quantum dots show a specific property that can be lit by radiation. Widths between energy levels increase according to decreasing sizes of quantum dots, energies required to stimulate corresponding quantum dots and energies released to return to the ground state of stimulated quantum dots are ascending accordingly, resulting in stimulation of quantum dots and blue shift phenomenon of fluorescence spectrum, luminescence spectrum can cover the whole visible region by controlling sizes of quantum dots. Such as a size of cadmium selenide (CdSe) descends from 6.6 nm to 2.0 nm, the according wavelength of light from red light region 635 nm 'blue shifts' to 460 nm of blue light region.

Quantum dots materials applied in display devices can significantly increase the color gamut of a display device and the ability of color reproduction. Until now, a number of papers and patents have published application of thin film transistor liquid crystal display (TFT-LCD) with quantum dots, in which quantum dots taking the place of conventional color film materials of TFT-LCD draws the most attention. Quantum dots substituting conventional color photoresistance can improve color gamut and penetration rate of TFT-LCD significantly, achieving better effects in display.

However, following problems exist in photoresists produced by quantum dot compound resin applied in manufacturing quantum dot color films: first, quantum dots are poor in heatproof, a conventional TFT photoresist process has to survive in a temperature more than 200 degrees, the heating temperature of a quantum dot photoresists needs to be curbed to make available quantum dot photoresists, which distinguishes ingredients of a quantum dot photoresist and that of a conventional photoresists, resulting in more research costs; second, quantum dots are pricy as well as toxic, amounts of quantum dots washed off during the developing step in a photoetching process are wasteful, further pollute the environment; third, application of quantum dot photoresists costs two or three photoetching processes which are expensive.

Color filter on array (COA) technology is a technique that disposing a color layer on an array substrate and forming a color filter film. Difficulties in alignment when manufacturing a display panel can be deducted due to aligning a color film substrate and an array substrate disappears in a display panel of COA structure, errors during alignment can be avoided, hence black matrixes can be designed to be a narrow line width to increase an aperture opening ratio.

SUMMARY OF THE DISCLOSURE

The technical issue that the embodiment of the present disclosure solves is to provide a method for manufacturing a COA array substrate, forming a quantum dot color filter film containing red, green, and blue filter layers on a TFT substrate by electrochemical deposition. Compared with a conventional method for manufacturing a quantum dot color filter film, the disclosure consumes less amount of quantum dots, less costs and is environmentally friendly.

The present disclosure further provides a COA array substrate, mounting a color filter film on one side of an array substrate, which has better display effects in color and be able to prevent a conventional problem of alignment of a CF substrate and a TFT substrate, and difficulties in alignment during manufacture of a display panel can be deducted, increasing the pixel aperture opening ratio.

The disclosure provides a method for manufacturing a COA array substrate, including the following steps:

Step 1, providing a TFT substrate, the TFT substrate including a base substrate, a TFT layer disposed on the base substrate, and a pixel electrode layer disposed on the TFT layer, the pixel electrode layer including a plurality of red sub-pixel electrodes, green sub-pixel electrodes and blue sub-pixel electrodes disposed alternately; black matrixes formed in interval regions of the plurality of red, green, blue sub-pixel electrodes on the TFT layer;

Step 2, providing a counter electrode, a first electrolyte, a second electrolyte, and a third electrolyte; the counter electrode including an insulating substrate, and a plurality of counter electrode units disposed on the insulating substrate, the plurality of counter electrode units disposed correspondingly to the plurality of red, green, blue sub-pixel electrodes on the TFT substrate; the first electrolyte being a weak acidic solution containing a mixture of red quantum dots and chitosan, the second electrolyte being a weak acidic solution containing a mixture of green quantum dots and chitosan, the third electrolyte being a weak acidic solution containing a mixture of scattering particles and chitosan;

Step 3, immersing the counter electrode and the TFT substrate into the first electrolyte altogether, forming a connecting circuit by linking the red sub-pixel electrodes on the TFT substrate and counter electrode units corresponding to the red sub-pixel electrodes on the counter electrode with a wire and a power source, the TFT substrate being an anode, the counter electrode being a cathode, after being electrified, a pH value of the first electrolyte close to the red sub-pixel electrodes on the TFT substrate raising, making the chitosan in the first electrolyte deposit on the red sub-pixel electrodes, the red quantum dots accompanied the chitosan depositing on the red sub-pixel electrodes, forming a number of red filter layers on the red sub-pixel electrodes respectively; controlling time of electrochemical deposition, cutting off the power when thickness of the red filter layers accumulated to be a certain value, taking out and cleansing the TFT substrate and the counter electrode;

Step 4, immersing the TFT substrate and the counter electrode into the second electrolyte altogether, forming a connecting circuit by linking the green sub-pixel electrodes on the TFT substrate and counter electrode units corresponding to the green sub-pixel electrodes on the counter electrode with a wire and a power source, the TFT substrate being an anode, the counter electrode being a cathode, after being electrified, a pH value of the second electrolyte close to the green sub-pixel electrodes on the TFT substrate raising, making the chitosan in the second electrolyte deposit on the green sub-pixel electrodes, the green quantum dots accompanied the chitosan depositing on the green sub-pixel electrodes, forming a plurality of green filter layers on the green sub-pixel electrodes respectively; controlling time of electrochemical deposition, cutting off the power when thickness of the green filter layers accumulated to be a certain value, taking out and cleansing the TFT substrate and the counter electrode;

Step 5, immersing the TFT substrate and the counter electrode into the third electrolyte altogether, forming a connecting circuit by linking the blue sub-pixel electrodes on the TFT substrate and counter electrode units corresponding to the blue sub-pixel electrodes on the counter electrode with a wire and a power source, the TFT substrate being an anode, the counter electrode being a cathode, after being electrified, a pH value of the third electrolyte close to the blue sub-pixel electrodes on the TFT substrate raising, making the chitosan in the third electrolyte deposit on the blue sub-pixel electrodes, the blue quantum dots accompanied the chitosan depositing on the blue sub-pixel electrodes, forming a plurality of blue filter layers on the blue sub-pixel electrodes respectively; controlling time of electrochemical deposition, powering off when thickness of the blue filter layers accumulated to be a certain value, taking out and cleansing the TFT substrate and the counter electrode;

The step 3, the step 4, and the step 5 can be processed randomly; after the steps 3-5, a quantum dot color filter film containing a plurality of red filter layers, green filter layers, and blue filter layers are formed on the pixel electrode layer to manufacture a COA array substrate.

Mass fractions of the chitosan in the first electrolyte, the second electrolyte, and the third electrolyte are 0.001%-10%; concentration of the red quantum dots in the first electrolyte and that of the green quantum dots in the second electrolyte are $10^{-6}$M-1M; concentration of the scattering particles in the third electrolyte is $10^{-6}$M-1M; pH values of the first electrolyte, the second electrolyte, and the third electrolyte are 2.0-7.0.

The mass fraction of the chitosan in the first electrolyte, the second electrolyte and the third electrolyte is 1%; the concentration of the red quantum dots in the first electrolyte and the green quantum dots in the second electrolyte is 0.5 mM; the concentration of the scattering particles in the third electrolyte is 0.5 mM; the pH value of the first electrolyte, the second electrolyte, and the third electrolyte is 5.2.

Particle sizes of the red quantum dots, the green quantum dots and the scattering particles are 2 nm-10 nm.

The red quantum dots are InP quantum dots coated with ZnS; the green quantum dots are InAs quantum dots coated with ZnS; the scattering particles are white, blue or transparent particles.

In the steps 3-5, voltages loaded between the red, green, blue sub-pixel electrodes on the TFT substrate and the corresponding counter electrode units on the counter electrodes are 0.01V-30V, time of electrification is within a range from 0.01 s to 1 h.

In the steps 3-5, a voltage loaded between the red, green, blue sub-pixel electrodes on the TFT substrate and the corresponding counter electrode units on the counter electrodes is 2V, time of electrification is 150 s.

A material of the counter electrode units is indium tin oxide, aluminum doped zinc oxide, nickel, stainless steel, silver, gold or platinum.

A material of the counter electrode units is gold or platinum.

The disclosure further provides a COA array substrate including a base substrate, a TFT layer disposed on the base substrate, a pixel electrode layer and black matrixes disposed on the TFT layer, and a quantum dot color filter film disposed on the pixel electrode layer; the pixel electrode layer includes a plurality of red sub-pixel electrodes, green sub-pixel electrodes and blue sub-pixel electrodes disposed alternately; the quantum dot color filter film includes a plurality of red, green, blue filter layers corresponding to the plurality of red, green, blue sub-pixel electrodes; a material of the red filter layers is a mixture of the red quantum dots and chitosan; a material of the green filter layers is a mixture of the green quantum dots and chitosan; a material of the blue filter layers is a mixture of scattering particles and chitosan.

The disclosure further provides a method for manufacturing a COA array substrate, including the following steps:

Step 1, providing a TFT substrate, the TFT substrate including a base substrate, a TFT layer disposed on the base substrate, and a pixel electrode layer disposed on the TFT layer, the pixel electrode layer including a plurality of red sub-pixel electrodes, green sub-pixel electrodes and blue sub-pixel electrodes disposed alternately; black matrixes formed in interval regions of the plurality of red, green, blue sub-pixel electrodes on the TFT layer;

Step 2, providing a counter electrode, a first electrolyte, a second electrolyte, and a third electrolyte; the counter electrode including an insulating substrate, and a plurality of counter electrode units disposed on the insulating substrate, the plurality of counter electrode units disposed correspondingly to the plurality of red, green, blue sub-pixel electrodes on the TFT substrate; the first electrolyte being a weak acidic solution containing a mixture of red quantum dots and chitosan, the second electrolyte being a weak acidic solution containing a mixture of green quantum dots and chitosan, the third electrolyte being a weak acidic solution containing a mixture of scattering particles and chitosan;

Step 3, immersing the counter electrode and the TFT substrate into the first electrolyte altogether, forming a connecting circuit by linking the red sub-pixel electrodes on the TFT substrate and counter electrode units corresponding to the red sub-pixel electrodes on the counter electrode with a wire and a power source, the TFT substrate being an anode, the counter electrode being a cathode, after being electrified, a pH value of the first electrolyte close to the red sub-pixel electrodes on the TFT substrate raising, making the chitosan in the first electrolyte deposit on the red sub-pixel electrodes, the red quantum dots accompanied the chitosan depositing on the red sub-pixel electrodes, forming a number of red filter layers on the red sub-pixel electrodes respectively; controlling time of electrochemical deposition, cutting off the power when thickness of the red filter layers accumulated to be a certain value, taking out and cleansing the TFT substrate and the counter electrode;

Step 4, immersing the TFT substrate and the counter electrode into the second electrolyte altogether, forming a connecting circuit by linking the green sub-pixel electrodes on the TFT substrate and counter electrode units corresponding to the green sub-pixel electrodes on the counter electrode with a wire and a power source, the TFT substrate being an anode, the counter electrode being a cathode, after being electrified, a pH value of the second electrolyte close to the green sub-pixel electrodes on the TFT substrate raising, making the chitosan in the second electrolyte deposit on the green sub-pixel electrodes, the green quantum dots accompanied the chitosan depositing on the green sub-pixel electrodes, forming a plurality of green filter layers on the green sub-pixel electrodes respectively; controlling time of electrochemical deposition, cutting off the power when thickness of the green filter layers accumulated to be a certain value, taking out and cleansing the TFT substrate and the counter electrode;

Step 5, immersing the TFT substrate and the counter electrode into the third electrolyte altogether, forming a connecting circuit by linking the blue sub-pixel electrodes on the TFT substrate and counter electrode units corresponding to the blue sub-pixel electrodes on the counter electrode with a wire and a power source, the TFT substrate being an anode, the counter electrode being a cathode, after being electrified, a pH value of the third electrolyte close to the blue sub-pixel electrodes on the TFT substrate raising, making the chitosan in the third electrolyte deposit on the blue sub-pixel electrodes, the blue quantum dots accompanied the chitosan depositing on the blue sub-pixel electrodes, forming a plurality of blue filter layers on the blue sub-pixel electrodes respectively; controlling time of electrochemical deposition, cutting off the power when thickness of the blue filter layers accumulated to be a certain value, taking out and cleansing the TFT substrate and the counter electrode;

The step 3, the step 4, and the step 5 can be processed randomly; after the steps 3-5, a quantum dot color filter film comprising a plurality of red filter layers, green filter layers, and blue filter layers are formed on the pixel electrode layer to manufacture a COA array substrate; mass fractions of the chitosan in the first electrolyte, the second electrolyte, and the third electrolyte are 0.001%-10%; concentration of the red quantum dots in the first electrolyte and that of the green quantum dots in the second electrolyte are $10^{-6}M$-$1M$; concentration of the scattering particles in the third electrolyte is $10^{-6}M$-$1M$; pH values of the first electrolyte, the second electrolyte, and the third electrolyte are 2.0-7.0; particle sizes of the red quantum dots, the green quantum dots and the scattering particles are 2 nm-10 nm; the red quantum dots are InP quantum dots coated with ZnS; the green quantum dots are InAs quantum dots coated with ZnS; the scattering particles are white, blue or transparent particles; in the steps 3-5, voltages loaded between the red, green, blue sub-pixel electrodes on the TFT substrate and the corresponding counter electrode units on the counter electrodes are 0.01V-30V, time of electrification is within a range from 0.01 s to 1 h.

Benefits of the disclosure: a method for manufacturing a COA array substrate according to the disclosure electrochemically deposits a quantum dot color filter film containing a red filter film, a green filter film, and a blue filter film on a TFT substrate utilizing properties of a pixel electrode pattern on the TFT substrate and solubility of chitosan varying according to different pH values, quantum dots are dispersed in the electrolyte before formed to be a film, only one property change is that concentration of quantum dots in the electrolyte decreases, the electrolyte can be recycled after being supplied with quantum dots, which can achieve 100% utilization of quantum dots, and compared with a conventional method for a color filter film, a high temperature process will be unnecessary, which increases a utilization ratio of quantum dots, and dismisses two to three times of photoetching processes, resulting in decreasing costs and protecting the environment. A COA array substrate according to the disclosure shows better display effects in color by forming a quantum dot color filter film on a pixel electrode layer, preventing light leakage due to errors in alignment of a conventional CF substrate and TFT substrate.

BRIEF DESCRIPTION OF THE DRAWINGS

In order to more clearly illustrate the embodiments of the present disclosure or prior art, the following figures will be described in the embodiments are briefly introduced.

In figures.

DETAILED DESCRIPTION OF PREFERRED EMBODIMENTS

Embodiments of the present disclosure are described in detail with reference to the accompanying drawings as follows.

The disclosure is achieved based on the following principles:

Chitosan, same as deacetylated chitin, is achieved by deacetylation of chitin, and chemically named as (1,4)-2-amino-2-deoxidation-β-D-glucan, a molecular structure is as follows:

Chitosan is soluble in water under weak acidic condition and insoluble in water under neutral and alkaline conditions. Therefore, if an electrode is immersed in a combination solution of chitosan and quantum dots, a pH value of solution adjacent to the electrode can be varied by an electrochemical reaction, and chitosan and quantum dots can be both deposited on the surface of the electrode; in a TFT-LCD, however, pixel electrodes fully cover a TFT array substrate, each pixel electrode is corresponding to a sub-pixel, a voltage and a current of the pixel electrode corresponding to the each sub-pixel can be controlled accurately by controlling a voltage of a gate and a voltage and a current of a source in the corresponding TFT; therefore, a single color quantum dot film of a corresponding color can be formed on a pixel electrode corresponding to the each sub-pixel by electrochemical deposition with assist of a pixel electrode pattern of a conventional TFT array substrate, in order to form a quantum dot color filter film.

Figure 1:
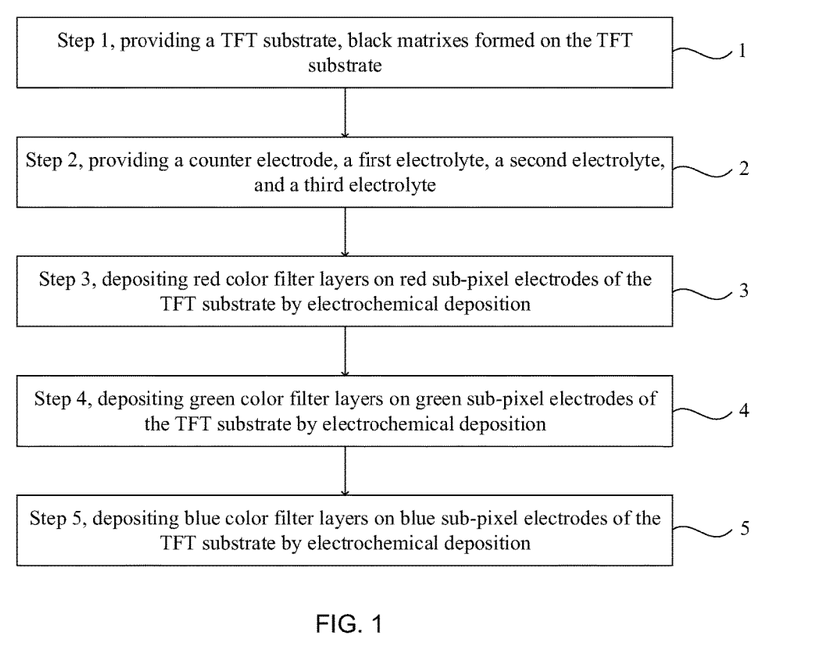
FIG. 1 is a flow chart of a method of manufacturing a COA array substrate according to the present disclosure.
Figure 2:
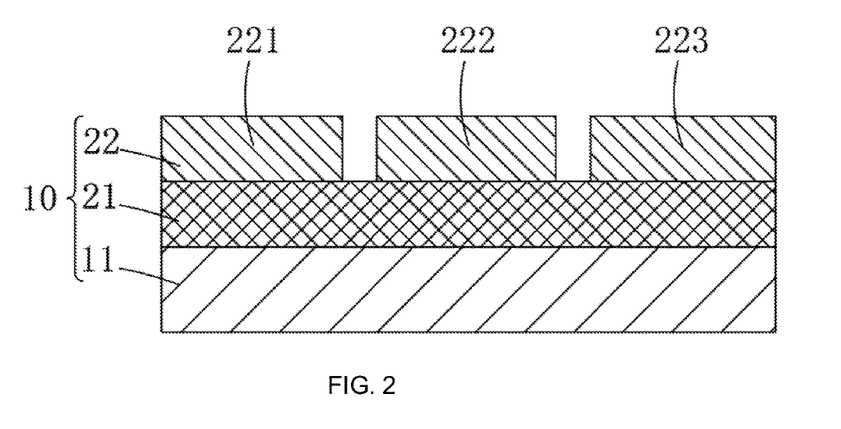
FIGS. 2-3 are structural diagrams of step 1 of a method for manufacturing a COA array substrate according to the disclosure
Figure 3:
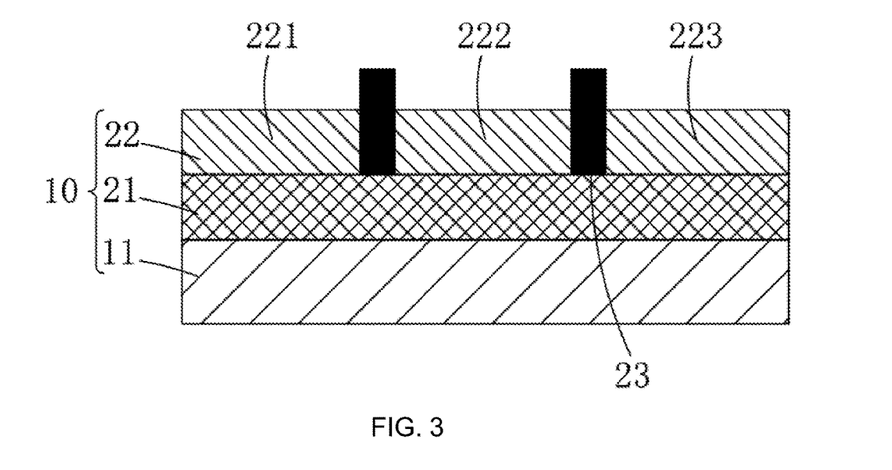

Referring to FIG. 1, the disclosure provides a method for manufacturing a COA array substrate, including the following steps:

Step 1, as shown in FIG. 2, providing a TFT substrate 10, the TFT substrate 10 including a base substrate 11, a TFT layer 21 disposed on the base substrate 11, and a pixel electrode layer 22 disposed on the TFT layer 21, the pixel electrode layer 22 including a plurality of red sub-pixel electrodes 221, green sub-pixel electrodes 222 and blue sub-pixel electrodes 223 disposed alternately; as shown in FIG. 3, black matrixes 23 formed in interval regions of the plurality of red sub-pixel electrodes 221, the plurality of green sub-pixel electrodes 222 and the plurality of blue sub-pixel electrodes 223 on the TFT layer 21.

Specifically, the TFT layer 21 includes a plurality of TFTs corresponding to the plurality of red sub-pixel electrodes 221, the plurality of green sub-pixel electrodes 222 and the plurality of blue sub-pixel electrodes 223 on the TFT layer 21 respectively.

Figure 4:
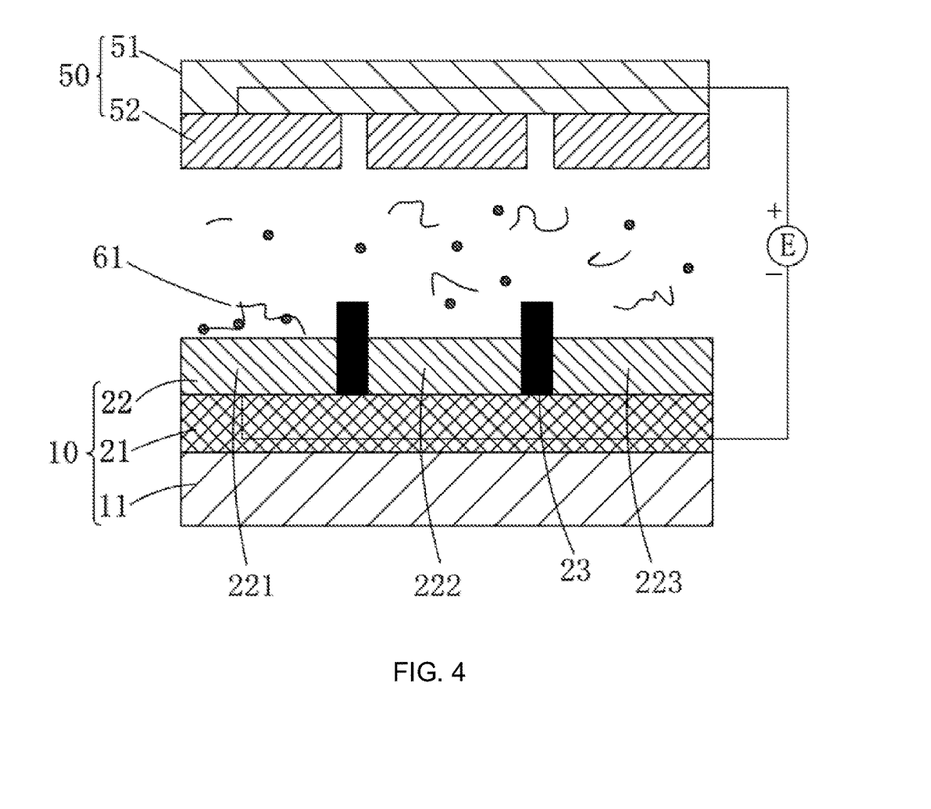
FIGS. 4-5 are structural diagrams of step 3 of a method for manufacturing a COA array substrate according to the disclosure.
Figure 6:
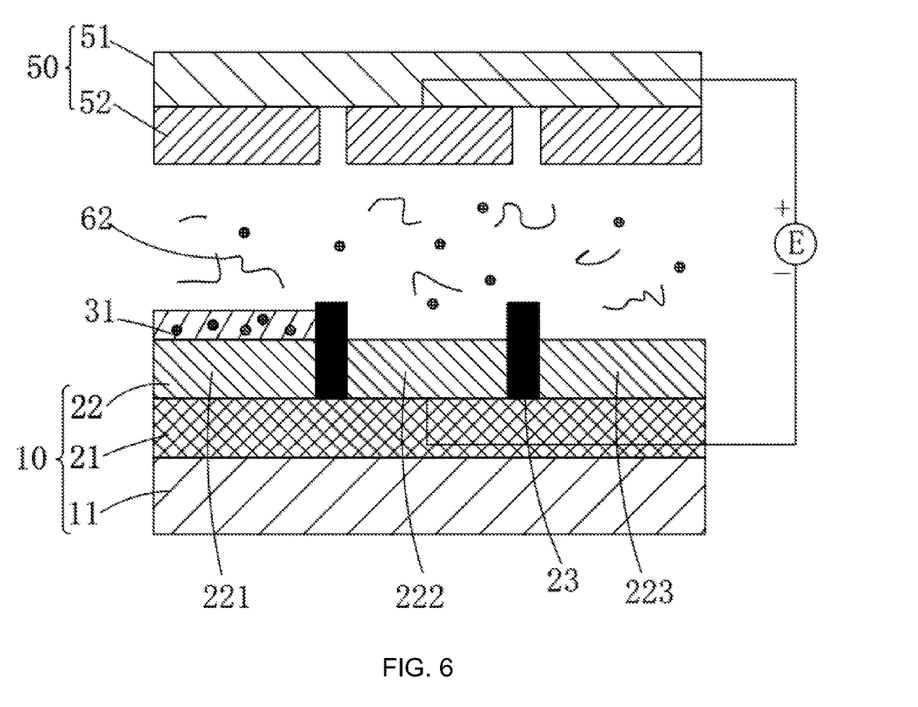
FIGS. 6-7 are structural diagrams of step 4 of a method for manufacturing a COA array substrate according to the disclosure.
Figure 8:
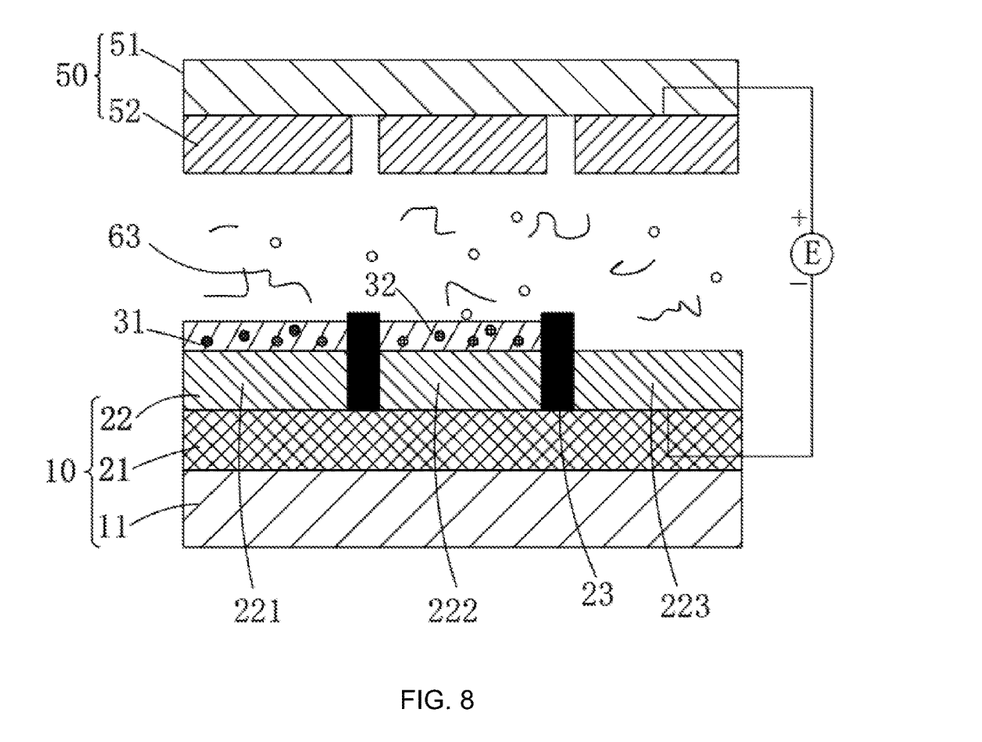
FIGS. 8-9 are structural diagrams of step 5 of a method for manufacturing a COA array substrate according to the disclosure.

Step 2, as shown in FIGS. 4, 6, and 8, providing a counter electrode 50, a first electrolyte 61, a second electrolyte 62, and a third electrolyte 63; the counter electrode 50 including an insulating substrate 51, and a plurality of counter electrode units 52 disposed on the insulating substrate 51, the plurality of counter electrode units 52 disposed correspondingly to the plurality of red sub-pixel electrodes 221, green sub-pixel electrodes 222, blue sub-pixel electrodes 223 on the TFT substrate 10; the first electrolyte 61 being a weak acidic solution containing a mixture of red quantum dots and chitosan, the second electrolyte 62 being a weak acidic solution containing a mixture of green quantum dots and chitosan, the third electrolyte 63 being a weak acidic solution containing a mixture of scattering particles and chitosan.

Specifically, a material of the counter electrode units 52 can be a conductive material resisting a weak acidic oxidation conditional aqueous solution, which can include but not limited to indium tin oxide (ITO), aluminum doped zinc oxide (AZO), nickel (Ni), stainless steel, silver, gold or platinum; preferably, a material of the counter electrode is gold or platinum.

Preferably, sizes and shapes of the counter electrode units 52 and the red sub-pixel electrodes 221, the green sub-pixel electrodes 222, the blue sub-pixel electrodes 223 are the same.

Specifically, pH values of the first electrolyte 61, the second electrolyte 62, and the third electrolyte 63 are 2.0-7.0, preferably 5.2.

Specifically, mass fractions of the chitosan in the first electrolyte 61, the second electrolyte 62, and the third electrolyte 63 are 0.001%-10%, preferably 1%.

Specifically, concentration of the red quantum dots in the first electrolyte 61 and that of the green quantum dots in the second electrolyte 62 are $10^{-6}$M-1M, preferably 0.5 mM.

Specifically, concentration of the scattering particles in the third electrolyte 63 is $10^{-6}$M-1M, preferably 0.5 mM.

Specifically, the red quantum dots are quantum dots that can emit red fluorescence, preferably are InP quantum dots coated with ZnS; the green quantum dots are quantum dots that can emit green fluorescence; preferably are InAs quantum dots coated with ZnS; the scattering particles are white, blue or transparent particles, preferably, a material of the scattering particles is resin.

Specifically, Particle sizes of the red quantum dots, the green quantum dots and the scattering particles are 2 nm-10 nm.

Figure 5:
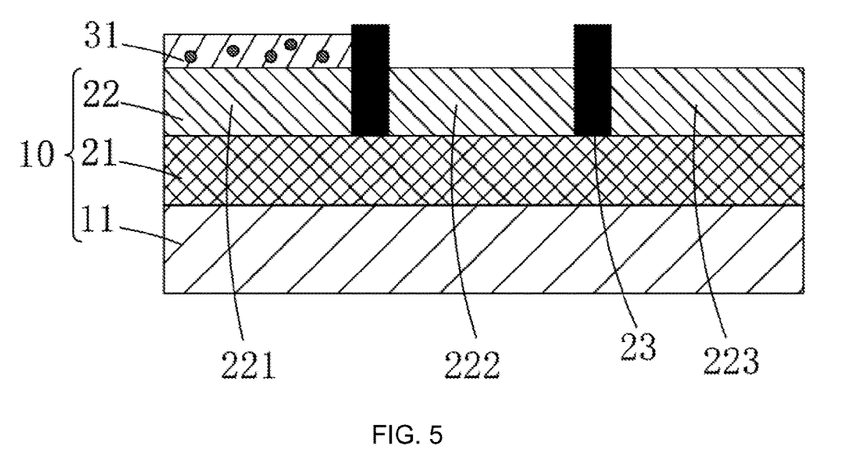

Step 3, as shown in FIGS. 4-5, immersing the counter electrode 50 and the TFT substrate 19 into the first electrolyte 61 altogether, forming a connecting circuit by linking the red sub-pixel electrodes 221 on the TFT substrate 10 and counter electrode units 52 corresponding to the red sub-pixel electrodes 221 on the counter electrode 50 with a wire and a power source, the TFT substrate 10 being an anode, the counter electrode 50 being a cathode, after being electrified, a pH value of the first electrolyte 61 close to the red sub-pixel electrodes 221 on the TFT substrate 10 raising, making the chitosan in the first electrolyte 61 deposit on the red sub-pixel electrodes 221, the red quantum dots accompanied the chitosan depositing on the red sub-pixel electrodes 221, forming a number of red filter layers 31 on the red sub-pixel electrodes 221 respectively; controlling time of electrochemical deposition, cutting off the power when thickness of the red filter layers 31 accumulated to be a certain value, taking out and cleansing the TFT substrate 10 and the counter electrode 50.

Figure 7:
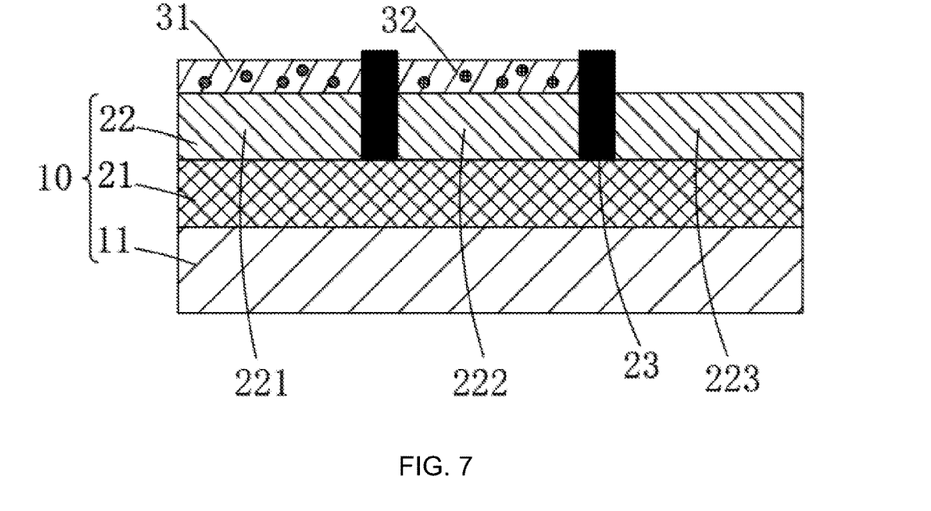

Step 4, as shown in FIGS. 6-7, immersing the TFT substrate 10 with deposition of the red filters 31 and the counter electrode 50 into the second electrolyte 62 altogether, forming a connecting circuit by linking the green sub-pixel electrodes 222 on the TFT substrate 10 and counter electrode units 52 corresponding to the green sub-pixel electrodes 222 on the counter electrode 50 with a wire and a power source, the TFT substrate 10 being an anode, the counter electrode 50 being a cathode, after being electrified, a pH value of the second electrolyte 62 close to the green sub-pixel electrodes 222 on the TFT substrate 10 raising, making the chitosan in the second electrolyte 62 deposit on the green sub-pixel electrodes 222, the green quantum dots accompanied the chitosan depositing on the green sub-pixel electrodes 222, forming a plurality of green filter layers 32 on the green sub-pixel electrodes 222 respectively; controlling time of electrochemical deposition, cutting off the power when thickness of the green filter layers 32 accumulated to be a certain value, taking out and cleansing the TFT substrate 10 and the counter electrode 50.

Figure 9:
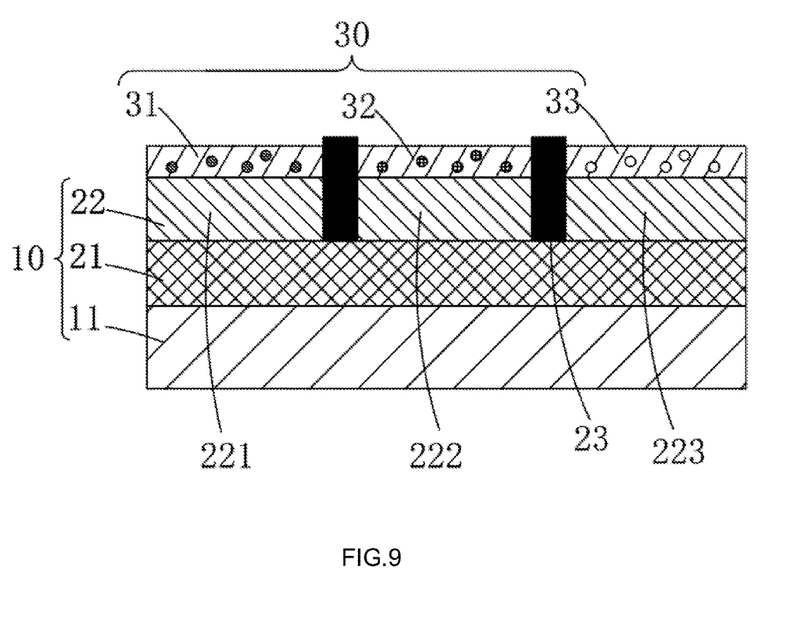

Step 5, as shown in FIGS. 8-9, immersing the TFT substrate 10 with deposition of the red filter layers 31 and the green filter layers 32 and the counter electrode 50 into the third electrolyte 63 altogether, forming a connecting circuit by linking the blue sub-pixel electrodes 223 on the TFT substrate 10 and counter electrode units 52 corresponding to the blue sub-pixel electrodes 223 on the counter electrode 50 with a wire and a power source, the TFT substrate 10 being an anode, the counter electrode 50 being a cathode, after being electrified, a pH value of the third electrolyte 63 close to the blue sub-pixel electrodes 223 on the TFT substrate 10 raising, making the chitosan in the third electrolyte 63 deposit on the blue sub-pixel electrodes 223, the blue quantum dots accompanied the chitosan depositing on the blue sub-pixel electrodes 223, forming a plurality of blue filter layers 33 on the blue sub-pixel electrodes 223 respectively; controlling time of electrochemical deposition, powering off when thickness of the blue filter layers 33 accumulated to be a certain value, taking out and cleansing the TFT substrate 10 and the counter electrode 50.

Specifically, the step 3, the step 4, and the step 5 can be processed randomly; after the steps 3-5, a quantum dot color filter film 30 containing a plurality of red filter layers 31, green filter layers 32, and blue filter layers 33 are formed on the pixel electrode layer 22 to manufacture a COA array substrate.

Specifically, in the steps 3-5, voltages loaded between the red/green/blue sub-pixel electrodes 221/222/223 on the TFT substrate 10 and the corresponding counter electrode units 52 on the counter electrodes 50 are 0.01V-30V, preferably 2V, time of electrification is within a range from 0.01 s to 1 h, preferably 150 s.

Figure 10:
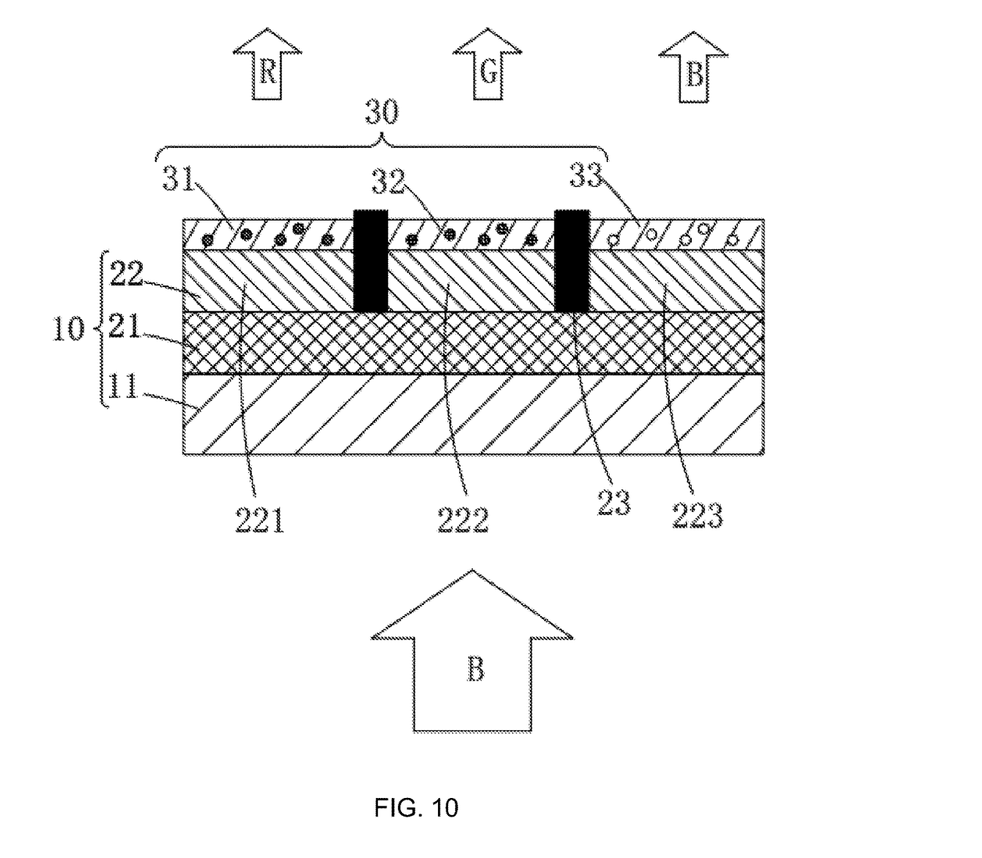
FIG. 10 is a structural diagram of a COA array substrate applied in color display manufactured according to the disclosure.

As shown in FIG. 10, when the achieved quantum dot color filter film 30 is applied in color display, red quantum dots in the red filter layers 31 emit red light by stimulation of blue backlight to show red, green quantum dots in the green filter layers 32 emit green light by stimulation of blue backlight to show green, the blue filter layers 33 is dim, the blue backlight penetrates the blue filter layers 33 to show blue, which can realize color display.

Referring to FIGS. 9-10, the disclosure further provides a COA array substrate according to the previous method, including a base substrate 11, a TFT layer 21 disposed on the base substrate 11, a pixel electrode layer 22 and black matrixes 23 disposed on the TFT layer 21, and a quantum dot color filter film 30 disposed on the pixel electrode layer 22; the pixel electrode layer 22 includes a plurality of red sub-pixel electrodes 221, green sub-pixel electrodes 222 and blue sub-pixel electrodes 223 disposed alternately; the quantum dot color filter film 30 includes a plurality of red, green, blue filter layers 31, 32, 33 corresponding to the plurality of red, green, blue sub-pixel electrodes 221, 222, 223.

Specifically, the black matrixes 23 are formed in interval regions of the plurality of red, green, blue sub-pixel electrodes 221, 222, 223 on the TFT layer 21.

Specifically, a material of the red filter layers 31 is a mixture of the red quantum dots and chitosan; a material of the green filter layers 32 is a mixture of the green quantum dots and chitosan; a material of the blue filter layers 33 is a mixture of scattering particles and chitosan.

Specifically, the red quantum dots are quantum dots that can emit red fluorescence, preferably are InP quantum dots coated with ZnS; the green quantum dots are quantum dots that can emit green fluorescence; preferably are InAs quantum dots coated with ZnS; the scattering particles are white, blue or transparent particles, preferably, a material of the scattering particles is resin.

Specifically, particle sizes of the red quantum dots, the green quantum dots and the scattering particles are 2 nm-10 nm.

Overall, the method for manufacturing a COA array substrate according to the disclosure utilizes properties of a pixel electrode pattern on the TFT substrate and solubility of chitosan varying according to different pH values to form a quantum dot color filter film containing red filter layers, green filter layers, and blue filter layers on the TFT substrate by electrochemical deposition, quantum dots are dispersed in the electrolyte before formed to be a film, only one property change is that concentration of quantum dots in the electrolyte decreases, the electrolyte can be recycled after being supplied with quantum dots, which can achieve 100% utilization of quantum dots, and compared with a conventional method for a color filter film, a high temperature process will be unnecessary, which increases a utilization ratio of quantum dots, and dismisses two to three times of photoetching processes, resulting in decreasing costs and protecting the environment. A COA array substrate according to the disclosure shows better display effects in color by forming a quantum dot color filter film on a pixel electrode layer, preventing light leakage due to errors in alignment of a conventional CF substrate and TFT substrate. Difficulties in alignment when manufacturing a display panel can be deducted to increase an aperture opening ratio of a pixel.

It is understandable in practical to the person who is skilled in the art that all or portion of the processes in the method according to the aforesaid embodiment can be accomplished with modifications and equivalent replacements. All these modifications and equivalent replacements within the spirit and principles of the embodiment described above should be covered by the protected scope of the disclosure.

What is claimed is:

1. A color-filter-on-array (COA) array substrate, comprising a base substrate, a thin film transistor (TFT) layer disposed on the base substrate, a pixel electrode layer and black matrixes disposed on the TFT layer, and a quantum dot color filter film disposed on the pixel electrode layer;

wherein the pixel electrode layer comprises a plurality of red sub-pixel electrodes, a plurality of green sub-pixel electrodes, and a plurality of blue sub-pixel electrodes disposed alternately;

wherein the quantum dot color filter film comprises a plurality of red, green, and blue filter layers corresponding to the red, green, and blue sub-pixel electrodes, respectively; and wherein a material of the red filter layers is a mixture of red quantum dots and chitosan; a material of the green filter layers is a mixture of green quantum dots and chitosan; and a material of the blue filter layers is a mixture of scattering particles and chitosan.

2. The COA array substrate according to claim 1, wherein the red quantum dots have a particle size between 2 nm-10 nm.

3. The COA array substrate according to claim 1, wherein the green quantum dots have a particle size between 2 nm-10 nm.

4. The COA array substrate according to claim 1, wherein the scattering particles have a particle size between 2 nm-10 nm.

5. The COA array substrate according to claim 1, wherein the red quantum dots comprise InP quantum dots coated with ZnS.

6. The COA array substrate according to claim 1, wherein the green quantum dots comprise InAs quantum dots coated with ZnS.

7. The COA array substrate according to claim 1, wherein the scattering particles comprise white, blue or transparent particles.

* * * * *